(12) United States Patent
Xiong

(10) Patent No.: US 12,301,541 B2
(45) Date of Patent: May 13, 2025

(54) REPORT CONTROL METHOD AND APPARATUS, DEVICE, MEDIUM, AND COMPUTER PROGRAM PRODUCT

(71) Applicant: TENCENT TECHNOLOGY (SHENZHEN) COMPANY LIMITED, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 215 days.

(21) Appl. No.: 17/989,473

(22) Filed: Nov. 17, 2022

(65) Prior Publication Data

US 2023/0074694 A1 Mar. 9, 2023

Related U.S. Application Data

(63) Continuation of application No. PCT/CN2022/078793, filed on Mar. 2, 2022.

(30) Foreign Application Priority Data

Apr. 2, 2021 (CN) .......................... 202110363841.9

(51) Int. Cl.
  *H04L 9/40* (2022.01)
(52) U.S. Cl.
  CPC ...... *H04L 63/0263* (2013.01); *H04L 63/1458* (2013.01)

(58) Field of Classification Search
  CPC ............ H04L 63/0263; H04L 63/1425; H04L 63/1458; H04L 63/20; H04L 61/4511; H04L 67/51; H04W 12/122; H04W 24/10
  See application file for complete search history.

(56) References Cited

U.S. PATENT DOCUMENTS

| | | | |
|---|---|---|---|
| 11,233,666 B2 | 1/2022 | Ding | |
| 2019/0116486 A1 | 4/2019 | Kim et al. | |
| 2019/0253917 A1* | 8/2019 | Dao | ................. H04W 28/0268 |
| 2019/0357118 A1* | 11/2019 | Kim | ..................... H04W 48/06 |
| 2020/0053828 A1 | 2/2020 | Bharatia et al. | |
| 2020/0112907 A1 | 4/2020 | Dao et al. | |
| 2020/0186977 A1* | 6/2020 | Xia | ..................... H04L 12/1407 |
| 2021/0218585 A1 | 7/2021 | Zhu et al. | |

(Continued)

FOREIGN PATENT DOCUMENTS

| | | |
|---|---|---|
| CN | 110140333 A | 8/2019 |
| CN | 110324800 A | 10/2019 |

(Continued)

OTHER PUBLICATIONS

Tao et al. English translation of CN 112533177 A. (Year: 2021).*

(Continued)

*Primary Examiner* — John M MacIlwinen
(74) *Attorney, Agent, or Firm* — ANOVA LAW GROUP PLLC

(57) ABSTRACT

A report control method includes: transmitting, by a session management function (SMF), control information to an edge application server discovery function (EASDF), the control information being used for banning, stopping, or reducing transmission of a report to the SMF by the EASDF.

18 Claims, 11 Drawing Sheets

(56) References Cited

U.S. PATENT DOCUMENTS

| | | | |
|---|---|---|---|
| 2021/0329504 A1 | 10/2021 | Wu et al. | |
| 2022/0159446 A1 | 5/2022 | Zhou et al. | |
| 2022/0287136 A1* | 9/2022 | Wei | H04W 72/23 |
| 2022/0377613 A1* | 11/2022 | Watfa | H04W 48/06 |

FOREIGN PATENT DOCUMENTS

| | | | |
|---|---|---|---|
| CN | 110972092 | A | 4/2020 |
| CN | 111093225 | A | 5/2020 |
| CN | 111385851 | A | 7/2020 |
| CN | 112312466 | A | 2/2021 |
| CN | 112543511 | A | 3/2021 |
| CN | 113114651 | A | 7/2021 |
| KR | 20190043084 | A | 4/2019 |
| WO | 2020063213 | A1 | 4/2020 |
| WO | 2021016631 | A2 | 1/2021 |
| WO | 2021056384 | A1 | 4/2021 |

OTHER PUBLICATIONS

The World Intellectual Property Organization (WIPO) International Search Report for PCT/CN2022/078793 May 20, 2022 7 Pages (including translation).

China National Intellectual Property Administration (CNIPA) Office Action 1 for 202110363841.9 Aug. 3, 2023 12 Pages (including translation).

The European Patent Office (Epo) The Extended European Search Report for 22778452.7 Apr. 16, 2024 11 Pages.

"3rd Generation Partnership Project; Technical Specification Group Services and System Aspects; 5G System Enhancements for Edge Computing; Stage 2 (Release 17)", 3GPP Standard; Technical Specification, vol. SA WG2, No. V0.1.0 Mar. 15, 2021 (Mar. 15, 2021).

Huawei et al., "EAS Discovery for Session Breakout connectivity model", 3GPP Draft; S2-2101098, vol. SA WG2, No. e-meeting; Feb. 24, 2021-Mar. 9, 2021 Mar. 10, 2021 (Mar. 10, 2021).

* cited by examiner

REPORT CONTROL METHOD AND APPARATUS, DEVICE, MEDIUM, AND COMPUTER PROGRAM PRODUCT

RELATED APPLICATION(S)

This application is a continuation application of PCT Patent Application No. PCT/CN2022/078793 filed on Mar. 2, 2022, which claims priority to Chinese Patent Application No. 2021103638419, filed with the Chinese Patent Office on Apr. 2, 2021 and entitled "REPORT CONTROL METHOD AND APPARATUS, DEVICE, AND MEDIUM", all of which are incorporated herein by reference entirety.

FIELD OF THE TECHNOLOGY

The present disclosure relates to the field of mobile communication, and particularly to a report control method and apparatus, a device, a medium, and a computer program product.

BACKGROUND

In an edge computing scenario, a domain name system (DNS) query transmitted by user equipment (UE) may be processed by an edge application server discovery function (EASDF).

A session management function (SMF) provides a reporting rule and a forwarding rule for the EASDF. The reporting rule provides a rule for the EASDF to transmit reports to the SMF, and the forwarding rule provides a rule for the EASDF to forward messages. After the UE transmits a DNS query to the EASDF, the EASDF may transmit a report to the SMF according to the reporting rule.

As the UE transmits DNS queries to the EASDF maliciously within a short time, the EASDF transmits reports to the SMF and triggers multiple pieces of control plane signaling, forming a signaling storm of a mobile communication system and resulting in a denial of service (DOS) attack. The mobile communication system may not be able to serve all normal UE.

SUMMARY

According to various embodiments of the present disclosure, a report control method and apparatus, a device, a medium, and a computer program product are provided. The technical solutions are as follows:

In one aspect, the present disclosure provides a report control method. The method includes: transmitting, by an SMF, control information to an EASDF, the control information being used for banning, stopping, reducing, or limiting transmission of a report to the SMF by the EASDF.

In another aspect, the present disclosure provides a report control method. The method includes: obtaining, by an EASDF, control information; and banning, stopping, reducing, or limiting, by the EASDF according to the control information, transmission of a report to an SMF.

In yet another aspect, the present disclosure provides a report control apparatus. The apparatus includes: a memory storing computer program instructions; and a processor coupled to the memory and configured to execute the computer program instructions and perform transmitting, by an SMF, control information to an EASDF, the control information being used for banning, stopping, reducing, or limiting transmission of a report to the SMF by the EASDF.

In yet another aspect, the present disclosure provides a report control apparatus. The apparatus includes: a memory storing computer program instructions; and a processor coupled to the memory and configured to execute the computer program instructions and perform obtaining, by an EASDF, control information; and banning, stopping, reducing, or limiting, by the EASDF according to the control information, transmission of a report to an SMF.

In yet another aspect, the present disclosure provides a computer-readable storage medium, storing a computer program, and the computer program being loaded and executed by a processor to implement the report control method.

Details of one or more embodiments of the present disclosure are provided in the accompanying drawings and descriptions below. Other features and advantages of the present disclosure are illustrated in the present disclosure, the accompanying drawings, and the claims.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
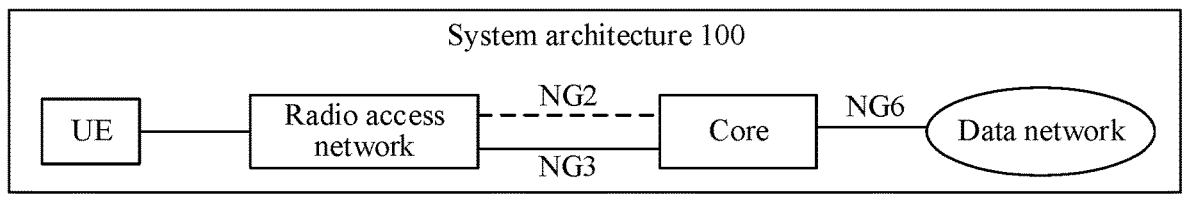
FIG. 1 is a schematic structural block diagram of a communication system according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

"And/or" describes the association relationship of associated objects and represents that three relationships may exist. For example, A and/or B may represent: only A exists, both A and B exist, and only B exists. The character "/" generally indicates an "or" relationship between the associated objects.

In an edge computing scenario, UE transmits a PDU session establishment request to an SMF. The SMF locates and selects an EASDF for the UE, and transmits a message to the selected EASDF, the message containing an IP address of the UE, a callback uniform resource identifier (URI), and a DNS message processing rule. A callback address refers to a URI of a target resource requested by the EASDF when actively initiating a message to the SMF.

In certain embodiment(s), the SMF provides reporting rules for the EASDF, and the EASDF transmits a report to the SMF according to at least two types of reporting rules as follows.

1: DNS Query Triggered Report

If (a) fully qualified domain name(s) (FQDN) of an edge application server (EAS) in a DNS query match(es) an FQDN(s) filter in a DNS message reporting rule, the SMF may provide a reporting rule to instruct the EASDF to transmit the FQDN(s) of the EAS to the SMF. Based on a received report, the SMF provides a forwarding rule for the EASDF. The EASDF forwards the DNS query to a local DNS, or forwards the DNS query to a C-DNS after adding an ECS attribute.

2: DNS Response Triggered Report

The SMF provides a reporting rule to instruct the EASDF to report an IP address/FQDN of an EAS to the SMF. If the IP address of the EAS in a DNS response matches an IP address range of the reporting rule, or the FQDN in a DNS response matches that in a DNS message reporting rule, the SMF may perform a UL CL insertion operation, which brings a relatively large number of signaling interactions. In particular, all the UE, a RAN, an AMF, an I-UPF, an L-PSA, etc., participate in the signaling interactions.

Since the SMF configures the reporting rule for the EASDF, if the UE transmits a DNS query to the EASDF, the EASDF may be triggered to transmit a report (or report message) to the SMF. This report may cause more subsequent signaling and messages. For example, if an uplink peak rate of 5G may reach 300 Mbps, namely a piece of UE may upload 300 Mb data in one second, the following calculation is made: 300M/8/1,500=25,000 DNS queries per UE per second, where 8 is the number of bits in a byte, and it is assumed that a length of a DNS query is 1,500 bytes.

Since a DNS query may trigger signaling interaction with the SMF as well as signaling of an uplink classifier (UL CL) insertion operation of the SMF, a signaling storm of a mobile communication system is formed, resulting in a DOS attack, and the mobile communication system is unable to serve all normal UE (since signaling of the 5G system is easily occupied by DOS, the mobile communication system may only serve a part of normal UE or is unable to serve normal UE at all).

In addition, multiple pieces of UE may simultaneously transmit DNS queries to the EASDF through coordination of different cells. This may cause a DDOS attack, forming a more serious attack, and as a result, the mobile communication system is almost unable to serve normal UE.

FIG. 1 is a schematic architectural diagram of a communication system according to an exemplary embodiment of the present disclosure. As shown in FIG. 1, the system architecture 100 may include: user equipment (UE), a radio access network (RAN), a core, and a data network (DN). The UE, the RAN, and the core are main components of the architecture, each of which may be logically divided into two parts: a user plane and a control plane, where the control plane is responsible for management of the mobile network, and the user plane is responsible for transmission of service data. In FIG. 1, reference point NG2 is located between the RAN control plane and the core control plane, reference point NG3 is located between the RAN user plane and the core user plane, and reference point NG6 is located between the core user plane and a data network.

UE: it is a portal for a mobile user to interact with the network, and may provide computing power and storage capacity, display a service window to the user, and accept an operational input of the user. The UE may establish a signal connection and a data connection with the RAN by use of a next-generation air interface technology to transmit a control signal and service data to the mobile network.

RAN: like a base station, it is deployed close to the UE to provide a network access function for an authorized user within coverage of a cell, and may transmit user data using transmission tunnels of different quality according to a user level, a service desirable, etc. The RAN may manage and make reasonable use of its own resources, provide access service for the UE on demand, and forward control signals and user data between the UE and the core.

Core: it is responsible for maintaining subscription data of the mobile network, managing network elements of the mobile network, and providing functions for the UE, such as session management, mobility management, policy management, and security authentication. The core provides network access authentication for the UE when the UE is attached, allocates a network resource to the UE when the UE has a service request, updates the network resource for the UE when the UE moves, provides a fast recovery mechanism for the UE when the UE is idle, releases the network resource for the UE when the UE is detached, and provides a data routing function for the UE when the UE has service data, such as forwarding uplink data to the DN, or receiving, from the DN, and forwarding, to the RAN, downlink data of the UE for transmission to the UE.

DN: it is a data network for providing business service for a user. In general, a client is located in the UE, while a server is located in the data network. The data network may be a private network, such as a local area network, an external network that is not controlled by an operator, such as Internet, or a proprietary network that is co-deployed by the operator, such as to configure IP multimedia network subsystem (IMS) service.

Figure 2:
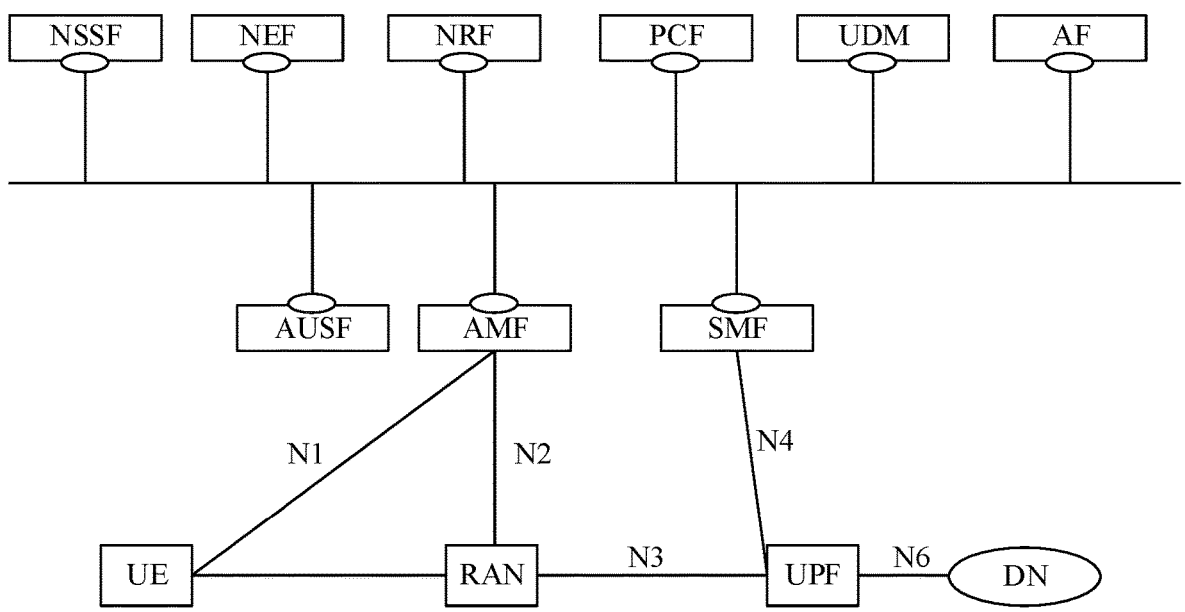
FIG. 2 is a schematic structural block diagram of a communication system according to certain embodiment(s) of the present disclosure.

FIG. 2 is a detailed architecture determined based on FIG. 1. The core user plane includes a user plane function (UPF). The core control plane includes an authentication server function (AUSF), an access and mobility management function (AMF), a session management function (SMF), a network slice selection function (NSSF), a network exposure function (NEF), an NF repository function (NRF), unified data management (UDM), a policy control function (PCF), and an application function (AF). Functions of these function entities are as follows:

UPF: performing user data packet forwarding according to a routing rule of the SMF;
AUSF: performing security authentication of the UE;
AMF: access and mobility management of the UE;
SMF: session management of the UE;
NSSF: selecting a network slice for the UE;
NEF: exposing a network function to a third party by means of an API;
NRF: providing functions of storing and selecting network function entity information for the other network elements;
UDM: user subscription context management;
PCF: user policy management; and
AF: user application management.

In the architecture shown in FIG. 2, an N1 interface is a reference point between the UE and the AMF. An N2 Interface is a reference point between the RAN and the AMF for transmission of a NAS message, etc. An N3 interface is a reference point between the RAN and the UPF for transmitting user plane data, etc. An N4 interface is a reference point between the SMF and the UPF for transmitting tunnel identification information of an N3 connection, data cache indication information, a downlink data notification message, and other information. An N6 interface is a reference point between the UPF and the DN for transmitting user plane data, etc. An NG interface is an interface between the radio access network and the 5G core.

It is to be noted that the names of the interfaces between various network elements in FIGS. 1 and 2 are merely an example, and may be other names in specific implementations. No specific limits are made thereto in the embodiments of the present disclosure. The names of the various network elements (such as the SMF, the AF, and the UPF) in FIGS. 1 and 2 are also merely an example and do not form limitations on the functions of the network elements. In a 5GS and other future networks, each of the network elements may also have other names, and no specific limits are made thereto in the embodiments of the present disclosure. For example, in a 6G network, part or all of the various network elements may be referred to as terms in 5G, or other names, etc., which are collectively described herein and will not be elaborated below. In addition, it is to be understood that the names of messages (or signaling) transmitted between the various network elements are also merely an example and do not form any limitation on the functions of the messages.

Figure 3:
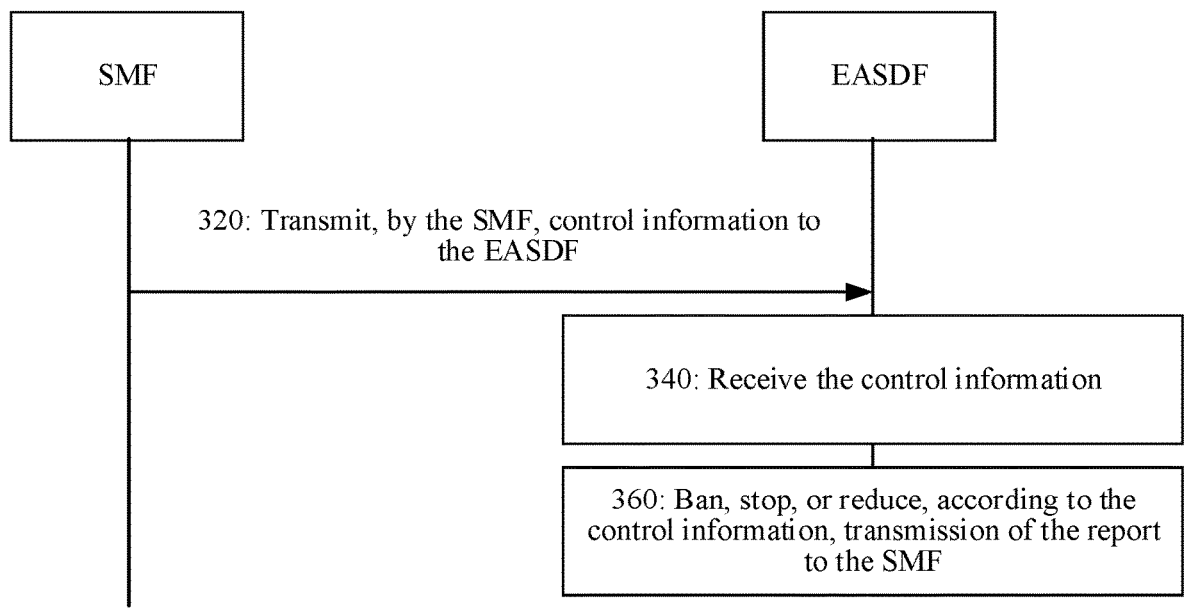
FIG. 3 is a schematic flowchart of a report control method according to certain embodiment(s) of the present disclosure.

FIG. 3 is a flowchart of a report control method according to an exemplary embodiment of the present disclosure. This embodiment is described taking the method being performed by an SMF and an EASDF as an example. The method includes the following steps:

Step 320: The SMF transmits control information to the EASDF, the control information being used for banning, stopping, reducing, or limiting transmission of a report to the SMF by the EASDF.

The report is a report transmitted by the EASDF triggered by a behavior of UE. The report includes at least one of at least two types of reports as follows:

type 1: a DNS query triggered report; and
type 2: a DNS response triggered report.

Exemplarily, the report includes a report satisfying a reporting rule configured by the SMF for the EASDF. Exemplarily, the reporting rule includes at least one of a reporting rule of type 1 and a reporting rule of type 2.

The reporting rule of type 1 is a reporting rule triggered by a DNS query. The reporting rule of type 2 is a reporting rule triggered by a DNS response.

The SMF transmits control information to the EASDF before recognizing a DOS attack or a DDOS attack. Alternatively, the SMF transmits control information to the EASDF after recognizing a DOS attack or a DDOS attack.

Step 340: The EASDF obtains the control information.

The EASDF receives the control information transmitted by the SMF.

Step 360: The EASDF bans, stops, reduces, or limits, according to the control information, transmission of the report to the SMF.

In summary, according to the method provided in this embodiment, the SMF transmits the control information to the EASDF, and the EASDF bans, stops, or reduces, according to the control information, transmission of the report to the SMF, and does not transmit reports to the SMF unlimitedly. Therefore, defense against a DOS attack or DDOS attack initiated by abnormal UE is implemented, and a mobile communication system may serve as much UE as possible.

There are at least four implementation modes for the control information. The following describes different embodiments as examples.

For Implementation Mode 1

Figure 4:
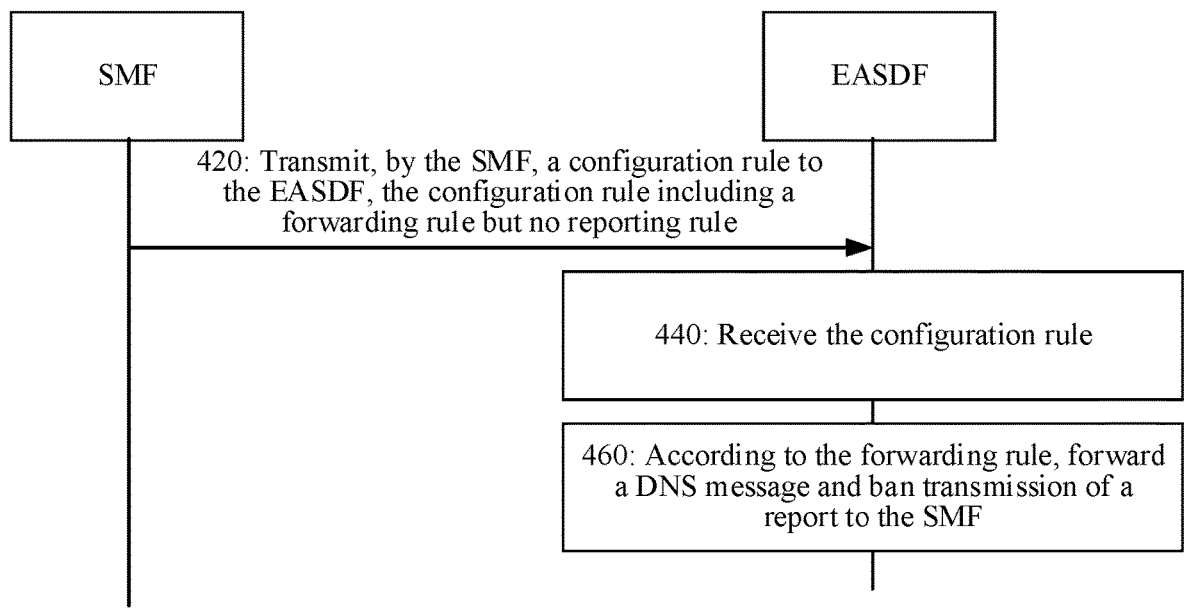
FIG. 4 is a schematic flowchart of a report control method according to certain embodiment(s) of the present disclosure.

FIG. 4 is a flowchart of a report control method according to an exemplary embodiment of the present disclosure. This embodiment is described taking the method being performed by an SMF and an EASDF as an example. The method includes the following steps:

Step 420: The SMF transmits a configuration rule to the EASDF, the configuration rule including a forwarding rule but no reporting rule.

Exemplarily, the forwarding rule is a rule for triggering the EASDF to forward a DNS message of UE. The reporting rule is a rule for triggering the EASDF to transmit a report.

Step 440: The EASDF receives the configuration rule.

The configuration rule is also referred to as a DNS message processing rule or a rule for processing a DNS message from a terminal.

Step 460: According to the forwarding rule, the EASDF forwards a DNS message and bans transmission of a report to the SMF.

Since the configuration rule includes the forwarding rule, the EASDF may forward the DNS message according to the forwarding rule. Since the configuration rule includes no reporting rule, the EASDF may not transmit any report to the SMF, namely the EASDF bans transmission of a report to the SMF.

In summary, according to the method provided in this embodiment, the SMF does not configure any reporting rule for the EASDF, so any report of the EASDF is directly banned, and the EASDF may not transmit any report to the SMF. Therefore, defense against a DOS attack or DDOS attack initiated by abnormal UE is implemented.

Figure 5:
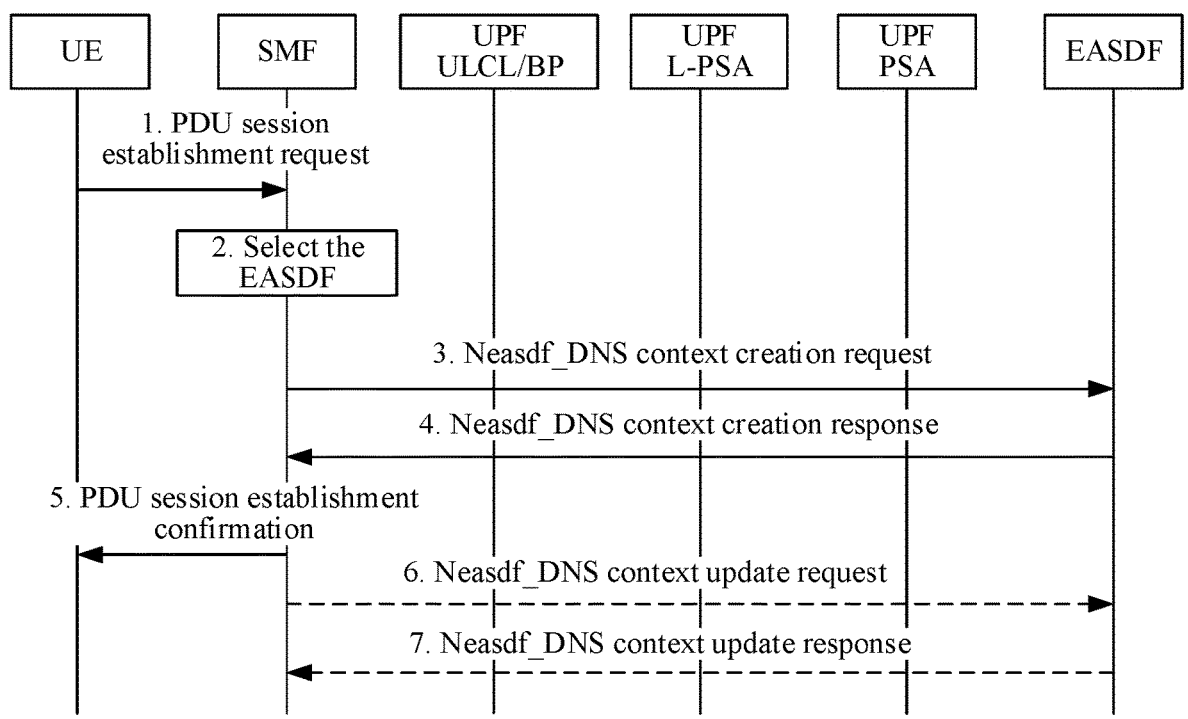
FIG. 5 is a schematic flowchart of part of steps of an EAS discovery method according to certain embodiment(s) of the present disclosure.

Exemplarily, the embodiment shown in FIG. 4 is described in combination with the communication protocol TS23.501. FIG. 5 is a flowchart of part of steps of an EAS discovery method in the communication protocol TS23.501.

FIG. 5 is a flowchart of a report control method according to another exemplary embodiment of the present disclosure. The method is performed by, for example, UE, an SMF, a UPF, an EASDF, and a DNS server. The method includes the following steps:

Step 1: The UE transmits a PDU session establishment request to the SMF.

Step 2: The SMF selects the EASDF.

The SMF selects a first EASDF for the UE. The first EASDF refers to an EASDF selected by the SMF for the UE.

The process of selecting the EASDF by the SMF may refer to related descriptions in section 6.3 of the communication protocol TS23.501. This selection process may be discovered using an NF repository function (NRF), or may be based on a local configuration of the SMF. The EASDF may already be registered in the NRF.

Step 3: The SMF transmits an Neasdf_DNS context creation request to the EASDF.

Neasdf refers to an interface or reference point between the SMF and the EASDF.

The SMF invokes the Neasdf_DNS context creation request to the selected EASDF. The Neasdf_DNS context creation request contains (an IP address of the UE, a callback URI, a rule for processing a DNS message from the UE).

The rule for processing the DNS message from the UE (i.e., the DNS message processing rule or the configuration rule) includes only a DNS message forwarding rule (i.e., the forwarding rule) but no DNS message reporting rule (i.e., the reporting rule).

The forwarding rule includes at least one of a DNS server address that may be forwarded and an ECS option that may be added.

The EASDF creates a DNS context for a PDU session, and stores the IP address of the UE, the callback URI, and the rule for processing the DNS message from the UE to the context.

The reporting rule includes a reporting condition for the EASDF to report a DNS message (including EAS related information) to the SMF when receiving a DNS query or a DNS response.

Step 4: The EASDF transmits an Neasdf_DNS context creation response to the SMF.

The EASDF invokes a service operation Neasdf_DNS context creation response (an IP address of the EASDF), and uses information that allows the SMF to update or delete the context later.

The IP address of the EASDF is an address of an EASDF connected with the UE as a DNS server of the PDU session.

Step 5: The SMF transmits a PDU session establishment confirmation to the UE.

The PDU session establishment confirmation contains address information of the first EASDF, referring to step 460 or 660.

Step 6: The SMF transmits an Neasdf_DNS context update request to the EASDF.

The SMF may invoke an Neasdf_DNS context update request (a PDU session context ID, a rule for processing a DNS query of the UE) to the EASDF.

An updated rule for processing the DNS query of the UE still includes only the DNS message forwarding rule (i.e., the forwarding rule) but no DNS message reporting rule (i.e., the reporting rule).

Step 7: The EASDF transmits an Neasdf_DNS context update response to the SMF.

The SMF only transmits the configuration forwarding rule to the EASDF in steps 3 and 6.

For Implementation Mode 2

Figure 6:
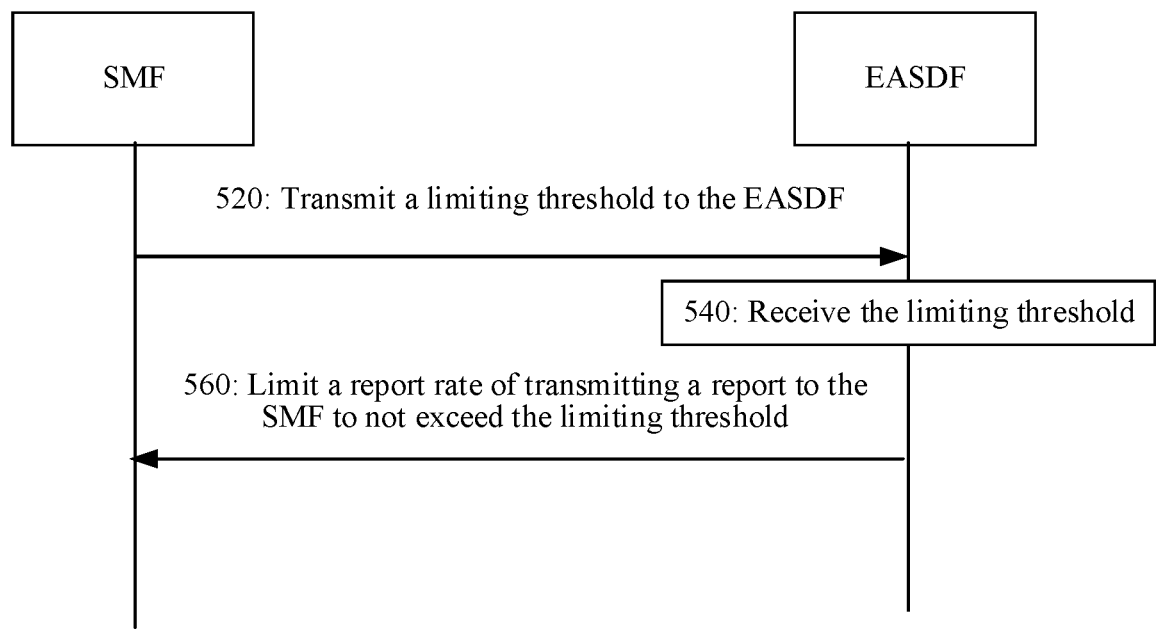
FIG. 6 is a schematic flowchart of a report control method according to certain embodiment(s) of the present disclosure.

FIG. 6 is a flowchart of a report control method according to an exemplary embodiment of the present disclosure. This embodiment is described taking the method being performed by an SMF and an EASDF as an example. The method includes the following steps:

Step 520: The SMF transmits a limiting threshold to the EASDF.

The limiting threshold is a threshold related to a report rate of the EASDF when transmitting a report. The limiting threshold may also be referred to as a report rate threshold.

For example, the limiting threshold is 500 per second. Alternatively, the limiting threshold is 10,000 per minute. The limiting threshold is configured by a network device or set forth in a communication protocol.

In certain embodiment(s), the SMF further transmits a configuration rule to the EASDF, including a forwarding rule and a reporting rule.

Step 540: The EASDF receives the limiting threshold.

The EASDF receives and stores the limiting threshold.

The EASDF calculates its own report rate. The report rate is a report rate of the EASDF in a last period of time, e.g., a report rate in last 5 seconds. Alternatively, the report rate is a report rate within a current time slice, e.g., a report rate within current 1 second.

Step 560: The EASDF limits a report rate of transmitting a report to the SMF to not exceed the limiting threshold.

In certain embodiment(s), the EASDF determines whether the report rate reaches the limiting threshold when there is a report desired to be transmitted. Alternatively, the EASDF determines whether the report rate reaches the limiting threshold at predetermined time intervals.

In certain embodiment(s), the EASDF transmits the report to the SMF if the report rate is less than the limiting threshold. The EASDF discards the report to be transmitted if the report rate is greater than or equal to the limiting threshold, to keep the report rate not exceeding the limiting threshold. Alternatively, the EASDF discards some reports randomly or selectively if the report rate is close to the limiting threshold, so that the rate of transmitting reports to the SMF may not reach a report limiting rate, i.e., the limiting threshold.

Exemplarily, the report includes at least one of a first-type report and a second-type report. The first-type report is a report triggered by a DNS query, and the second-type report is a report triggered by a DNS response.

In an embodiment, the limiting threshold includes a shared threshold, the shared threshold being a threshold shared by at least two types of reports of the EASDF.

In another embodiment, the limiting threshold includes a first threshold and a second threshold, the first threshold being a threshold corresponding to a first-type report of the EASDF, and the second threshold being a threshold corresponding to a second-type report of the EASDF. Exemplarily, the first-type report is a DNS query report, and the second-type report is a DNS response report.

Exemplarily, the shared threshold may also be referred to as a shared report rate threshold, the first threshold may also be referred to as a first-type report rate threshold, and the second threshold may also be referred to as a second-type report rate threshold.

In summary, according to the method provided in this embodiment, the SMF provides the limiting threshold for the EASDF, and the EASDF autonomously limits the rate of reporting to the SMF to ensure that the report rate does not exceed the limiting threshold, so that the number of reports transmitted by the EASDF to the SMF in unit time is reduced, and the EASDF does not transmit reports to the SMF unlimitedly. Therefore, defense against a DOS attack or DDOS attack initiated by abnormal UE is implemented, and a mobile communication system may serve as much UE as possible.

Figure 7:
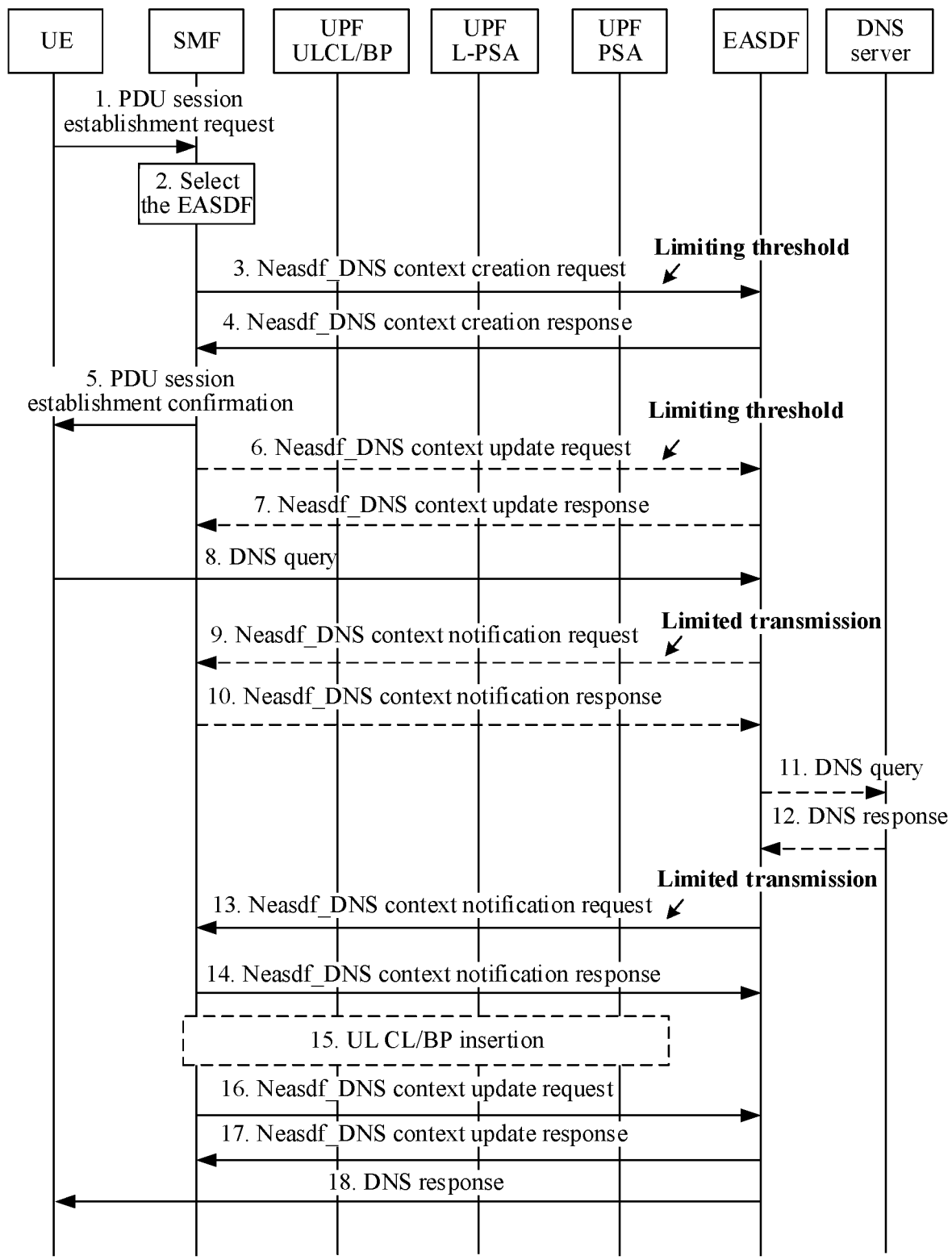
FIG. 7 is a schematic flowchart of an EAS discovery method according to certain embodiment(s) of the present disclosure.

Exemplarily, the embodiment shown in FIG. 4 is described in combination with the communication protocol TS23.501. FIG. 7 is a flowchart of an EAS discovery method in the communication protocol TS23.501.

FIG. 7 is a flowchart of a report control method according to another exemplary embodiment of the present disclosure. The method is performed by, for example, UE, an SMF, a UPF, an EASDF, and a DNS server. The method includes the following steps:

Step 1: The UE transmits a PDU session establishment request to the SMF.

Step 2: The SMF selects the EASDF.

Step 3: The SMF transmits an Neasdf_DNS context creation request to the EASDF.

Step 4: The EASDF transmits an Neasdf_DNS context creation response to the SMF.

Step 5: The SMF transmits a PDU session establishment confirmation to the UE.

Step 6: The SMF transmits an Neasdf_DNS context update request to the EASDF.

Step 7: The EASDF transmits an Neasdf_DNS context update response to the SMF.

Step 8: The UE transmits a DNS query to the EASDF.

Step 9: The EASDF transmits an Neasdf_DNS context notification request to the SMF.

Step 10: The SMF transmits an Neasdf_DNS context notification response to the EASDF.

Step 11: The EASDF transmits the DNS query to the DNS server.

Step 12: The DNS server transmits a DNS response to the EASDF.

Step 13: The EASDF transmits an Neasdf_DNS context notification request to the SMF.

Step 14: The SMF transmits an Neasdf_DNS context notification response to the EASDF.

Step 15: UL CL/branching point (BP) insertion is performed.

Step 16: The SMF transmits an Neasdf_DNS context update request to the EASDF.

Step 17: The EASDF transmits an Neasdf_DNS context update response to the SMF.

Step 18: The EASDF transmits the DNS response to the UE.

The SMF transmits a limiting threshold to the EASDF in step 3, or the SMF transmits or updates a limiting threshold to the EASDF in step 6.

In an embodiment, the limiting threshold includes a shared threshold, the shared threshold being a threshold shared by at least two types of reports of the EASDF. That is: a DNS report includes a shared report rate threshold (per second). For the EASDF, at least two types of reports corresponding to the DNS query and the DNS response share the shared report rate threshold, referred to as a threshold for short. The EASDF may control its report rate below the shared report rate threshold. That is, the EASDF discards part of reports when the report rate is greater than or equal to the shared report rate threshold.

In another embodiment, the limiting threshold includes a first threshold and a second threshold, the first threshold being a threshold corresponding to a first-type report of the EASDF, and the second threshold being a threshold corresponding to a second-type report of the EASDF. The first threshold may also be referred to as a first-type report rate threshold, and the second threshold may also be referred to as a second-type report rate threshold. That is: there is also the first-type report rate threshold (per second) for a DNS query report. The EASDF may control its report rate below the first-type report rate threshold. That is, the EASDF discards part of reports when the report rate is greater than or equal to the first-type report rate threshold.

There is also the second-type report rate threshold (per second) for a DNS response report. The EASDF may control its report rate below the second-type report rate threshold. That is, the EASDF discards part of reports when the report rate is greater than or equal to the second-type report rate threshold.

That is, the first-type report rate threshold is used for limiting a transmission rate of message 9, and the second-type report rate threshold is used for limiting a transmission rate of message 13 (corresponding to steps 13 to 17). If the DNS query report and the DNS response report share the shared report rate threshold, the transmission rates of message 9 and message 13 are limited at the same time.

For Implementation Mode 3

Figure 8:
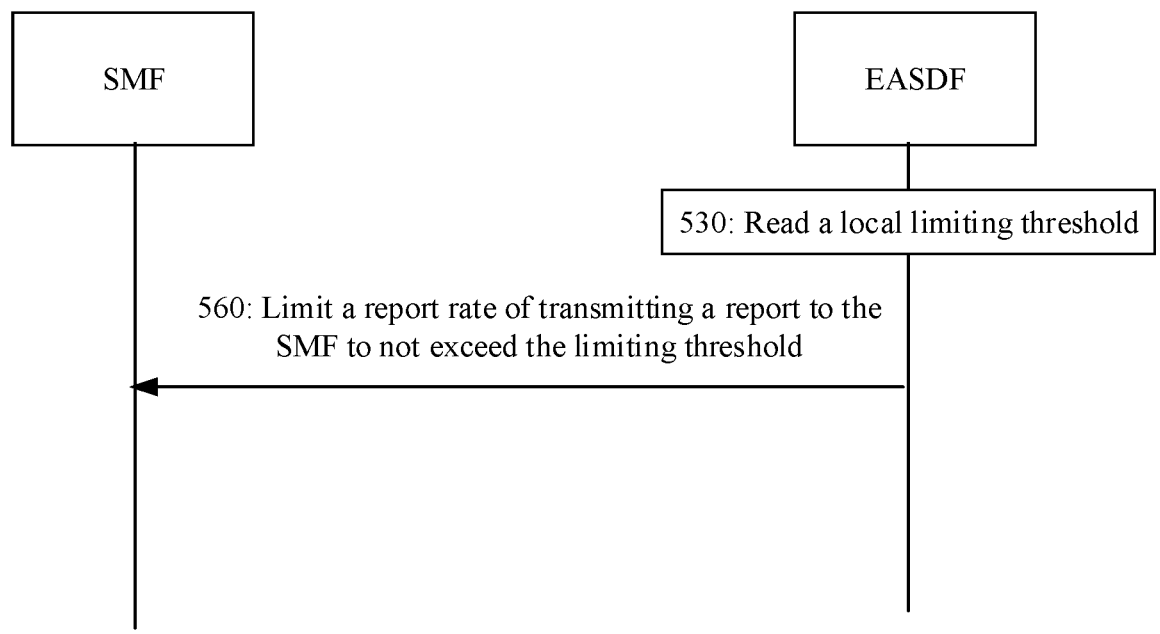
FIG. 8 is a schematic flowchart of a report control method according to certain embodiment(s) of the present disclosure.

FIG. 8 is a flowchart of a report control method according to an exemplary embodiment of the present disclosure. This embodiment is described taking the method being performed by an SMF and an EASDF as an example. The method includes the following steps:

Step 530: The EASDF reads a local limiting threshold.

The EASDF obtains a local limiting threshold. The local limiting threshold may be predefined in a communication protocol, generated according to a local policy, or configured by a network management system.

The EASDF determines whether a report rate reaches the limiting threshold.

The EASDF calculates its own report rate. The report rate is a report rate of the EASDF in a last period of time, e.g., a report rate in last 5 seconds. Alternatively, the report rate is a report rate within a current time slice, e.g., a report rate within current 1 second.

In certain embodiment(s), the EASDF determines whether the report rate reaches the limiting threshold when there is a report desired to be transmitted. Alternatively, the EASDF determines whether the report rate reaches the limiting threshold at predetermined time intervals.

In certain embodiment(s), step 560 is performed if the report rate is less than the limiting threshold, or step 580 is performed if the report rate is greater than or equal to the limiting threshold. In certain embodiment(s), step 560 is performed if the report rate is less than or equal to the limiting threshold, or step 580 is performed if the report rate is greater than the limiting threshold.

Step 560: The EASDF limits a report rate of transmitting a report to the SMF to not exceed the limiting threshold.

In certain embodiment(s), the EASDF determines whether the report rate reaches the limiting threshold when there is a report desired to be transmitted. Alternatively, the EASDF determines whether the report rate reaches the limiting threshold at predetermined time intervals.

In certain embodiment(s), the EASDF transmits the report to the SMF if the report rate is less than the limiting threshold. The EASDF discards the report to be transmitted if the report rate is greater than or equal to the limiting threshold, to keep the report rate not exceeding the limiting threshold. Alternatively, the EASDF discards some reports randomly or selectively if the report rate is close to the limiting threshold, so that the rate of transmitting reports to the SMF may not reach the limiting threshold.

Exemplarily, the report includes at least one of a first-type report and a second-type report. The first-type report is a report triggered by a DNS query, and the second-type report is a report triggered by a DNS response.

In an embodiment, the limiting threshold includes a shared threshold, the shared threshold being a threshold shared by at least two types of reports of the EASDF.

That is, the limiting threshold is at least one of DNS report rate thresholds (per second) according to a local policy and configuration. Under this threshold, the EASDF may share and control DNS query and DNS response report rates. That is, the EASDF discards part of reports when the report rate is greater than or equal to the threshold.

In another embodiment, the limiting threshold includes a first threshold and a second threshold, the first threshold being a threshold corresponding to a first-type report of the EASDF, and the second threshold being a threshold corresponding to a second-type report of the EASDF. Exemplarily, the first-type report is a report triggered by a DNS query, and the second-type report is a report triggered by a DNS response.

That is, the limiting threshold is at least one of DNS query report rate thresholds (per second) according to a local policy and configuration. The EASDF may control its DNS query report rate below the local threshold. That is, the EASDF discards part of reports when the report rate is greater than or equal to the threshold.

That is, the limiting threshold is at least one of DNS response report rate thresholds (per second) according to a local policy and configuration. The EASDF may control its DNS response report rate below the local threshold. That is, the EASDF discards part of reports when the report rate is greater than or equal to the threshold.

In summary, according to the method provided in this embodiment, the EASDF reads the local limiting threshold, and no longer transmits any report to the SMF when the report rate reaches the limiting threshold, so that the number of reports transmitted by the EASDF to the SMF in unit time is reduced, and the EASDF does not transmit reports to the SMF unlimitedly. Therefore, defense against a DOS attack or DDOS attack initiated by abnormal UE is implemented, and a mobile communication system may serve as much UE as possible.

It is to be noted that, when the two embodiments shown in FIGS. 6 and 8 are combined, the EASDF may obtain two sets of limiting thresholds simultaneously, where one set of limiting threshold is a limiting threshold configured by the SMF, and the other is a local limiting threshold. A priority of the limiting threshold configured by the SMF is higher than that of the local limiting threshold. That is, the EASDF uses the limiting threshold configured by the SMF first.

The EASDF uses the local limiting threshold when having no limiting threshold configured by the SMF but only the local limiting threshold.

For Implementation Mode 4

Figure 9:
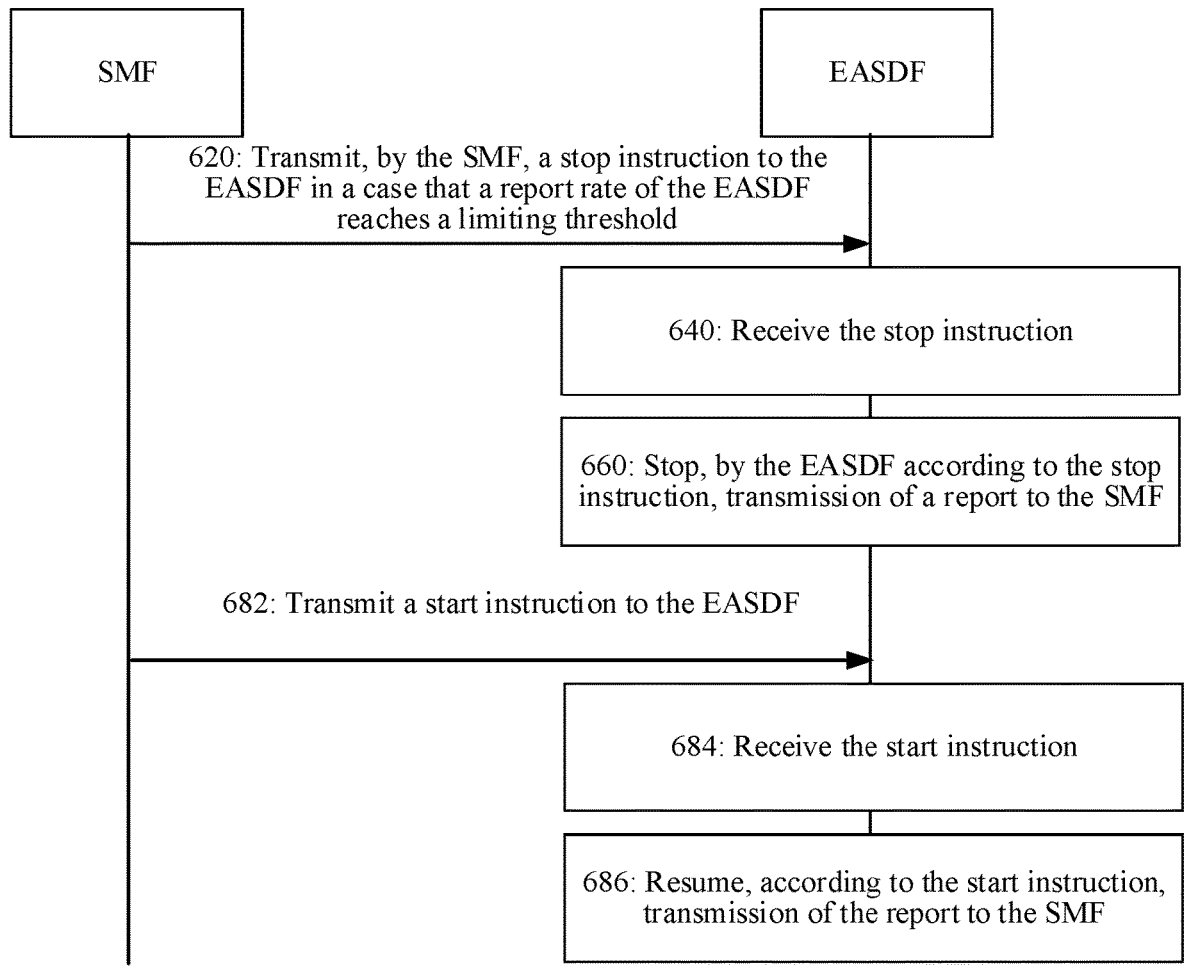
FIG. 9 is a schematic flowchart of a report control method according to certain embodiment(s) of the present disclosure.

FIG. 9 is a flowchart of a report control method according to an exemplary embodiment of the present disclosure. This embodiment is described taking the method being performed by an SMF and an EASDF as an example. The method includes the following steps:

Step 620: The SMF transmits a stop instruction to the EASDF when or in response to a determination that a report rate of the EASDF reaches a limiting threshold, the stop instruction being used for instructing the EASDF to stop transmission of a report.

The limiting threshold is a threshold related to the report rate of the EASDF when transmitting the report. The limiting threshold may also be referred to as a report rate threshold.

For example, the limiting threshold is 500 per second. Alternatively, the limiting threshold is 10,000 per minute. The limiting threshold is configured by another network device or set forth in a communication protocol.

The SMF determines whether the report rate of the EASDF reaches the limiting threshold. The report rate of the EASDF is obtained by dividing the number of reports received by the SMF by time.

In certain embodiment(s), the report rate of the EASDF is calculated by the SMF. However, this embodiment does not exclude the possibility that the EASDF reports the report rate to the SMF after calculating the report rate.

The report rate is a report rate of the EASDF in a last period of time, e.g., a report rate in last 5 seconds. Alternatively, the report rate is a report rate within a current time slice, e.g., a report rate within current 1 second.

In certain embodiment(s), the SMF continues receiving reports of the EASDF if the report rate is less than the limiting threshold, or step 620 is performed if the report rate is greater than or equal to the limiting threshold. In certain embodiment(s), the SMF continues receiving reports of the EASDF if the report rate is less than or equal to the limiting threshold, or step 620 is performed if the report rate is greater than the limiting threshold.

Step 640: The EASDF receives the stop instruction.

In certain embodiment(s), the stop instruction is contained in the Neasdf_DNS context update request shown in step 6 in FIG. 7. For example, the stop instruction is contained in a DNS query and/or response report stop instruction field in the Neasdf_DNS context update request.

In a design, the stop instruction includes a shared stop instruction, the shared stop instruction being used for instructing the EASDF to stop two types of reports, namely simultaneously stopping a first-type report and a second-type report.

In another design, the stop instruction includes at least one of a first stop instruction and a second stop instruction, the first stop instruction being used for instructing the EASDF to stop transmission of a first-type report, and the second stop instruction being used for instructing the EASDF to stop transmission of a second-type report.

In general, the stop instruction may be transmitted at any time, in particular, after step 10 or 14 in FIG. 7.

Step 660: The EASDF stops, according to the stop instruction, transmission of a report to the SMF.

The EASDF simultaneously stops transmission of the first-type report and the second-type report if the stop instruction includes the shared stop instruction. The EASDF stops transmission of the first-type report if the stop instruction includes the first stop instruction. The EASDF stops transmission of the second-type report if the stop instruction includes the second stop instruction.

Step 682: The SMF transmits a start instruction to the EASDF, the start instruction being used for instructing the EASDF to resume transmission of the report.

The start instruction may be transmitted at any time after step 660.

In certain embodiment(s), the start instruction is contained in the Neasdf_DNS context update response shown in step 7 in FIG. 7. For example, the start instruction is contained in at least one of DNS query and response report start instruction fields in the Neasdf_DNS context update response.

In a design, the start instruction includes a shared start instruction, the shared start instruction being used for instructing the EASDF to resume transmission of the two types of reports, namely simultaneously resuming transmission of the first-type report and the second-type report.

In another design, the start instruction includes at least one of a first start instruction and a second start instruction, the first start instruction being used for instructing the EASDF to resume transmission of the first-type report, and the second start instruction being used for instructing the EASDF to resume transmission of the second-type report.

Step 684: The EASDF receives the start instruction.

In certain embodiment(s), the start instruction is contained in the Neasdf_DNS context update response shown in step 7 in FIG. 7. For example, the start instruction is contained in at least one of the DNS query and response report start instruction fields in the Neasdf_DNS context update response.

Step 686: The EASDF resumes, according to the start instruction, transmission of the report to the SMF.

The EASDF simultaneously resumes transmission of the first-type report and the second-type report if the start instruction includes the shared start instruction. The EASDF resumes transmission of the first-type report if the start instruction includes the first start instruction. The EASDF resumes transmission of the second-type report if the start instruction includes the second start instruction.

If the Neasdf_DNS context update response does not include back off time, transmission of the report may be resumed only when the EASDF receives the start instruction transmitted by the SWF again. The EASDF may not start transmitting any report to the SMF even if another Neasdf_DNS context update request message for updating a reporting rule is received during this time.

In summary, according to the method provided in this embodiment, the SMF transmits the stop instruction or the start instruction to the EASDF to actively control the EASDF to stop or resume transmission of the report, so that the SMF may actively control a report transmission mechanism of the EASDF, and the EASDF may not transmit reports to the SMF unlimitedly. Therefore, defense against a DOS attack or DDOS attack initiated by abnormal UE is implemented, and a mobile communication system may serve as much UE as possible.

In addition, the SMF may actively recover the reporting mechanism of the EASDF, to ensure normal use of UL CL insertion, BP insertion, and other functions.

Figure 10:
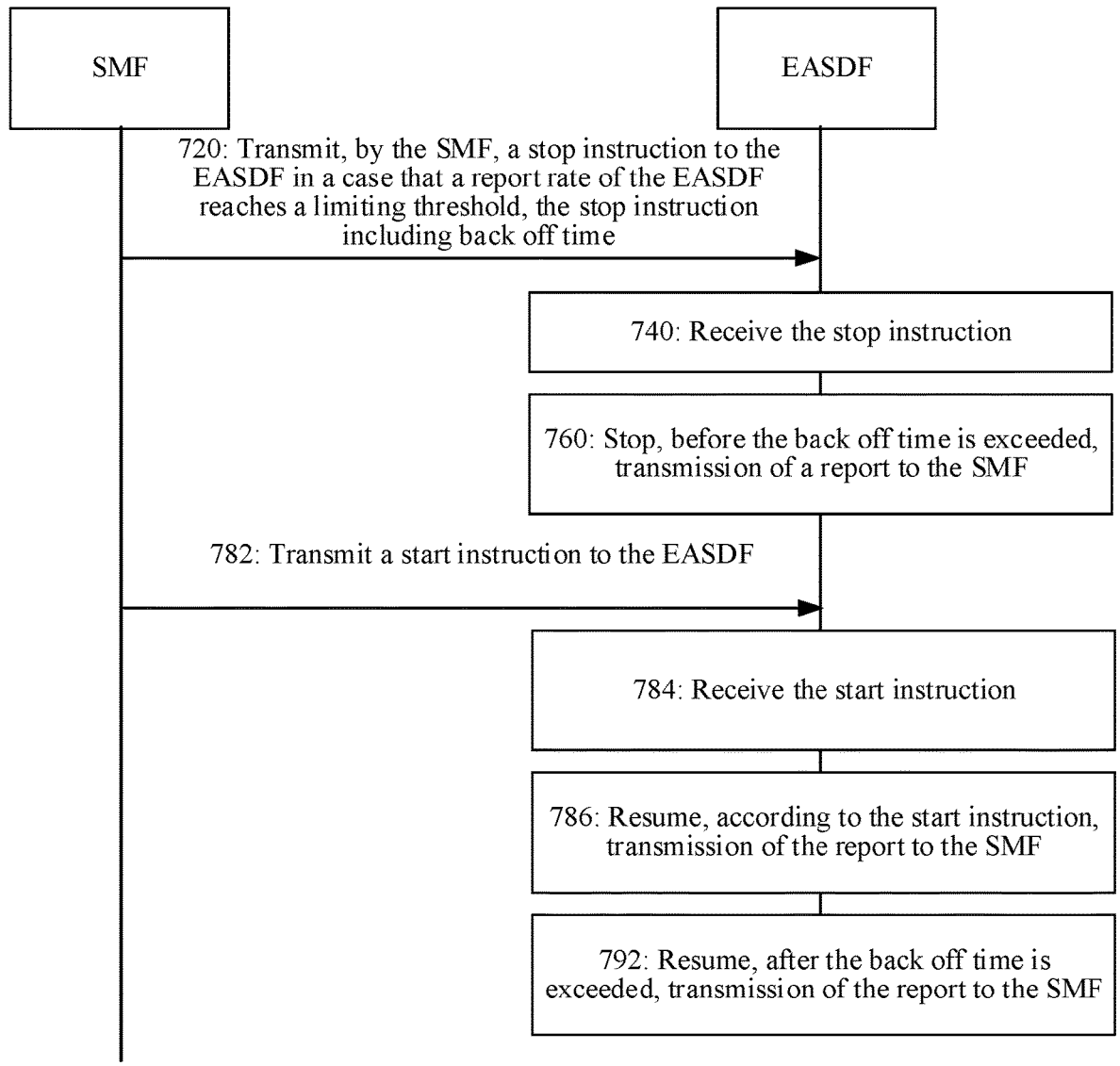
FIG. 10 is a schematic flowchart of a report control method according to certain embodiment(s) of the present disclosure.

FIG. 10 is a flowchart of a report control method according to an exemplary embodiment of the present disclosure. This embodiment is described taking the method being performed by an SMF and an EASDF as an example. The method includes the following steps:

Step 720: The SMF transmits a stop instruction to the EASDF when or in response to a determination that a report rate of the EASDF reaches a limiting threshold, the stop instruction including back off time.

The implementation of this step may refer to step 620. Unlike step 620, the stop instruction in this embodiment further includes back off time, the back off time indicating time when the EASDF stops transmission of a report.

In certain embodiment(s), the back off time is 5 minutes.

Step 740: The EASDF receives the stop instruction.

In certain embodiment(s), the stop instruction is contained in the Neasdf_DNS context update request shown in step 6 in FIG. 7.

In certain embodiment(s), the stop instruction is contained in at least one of DNS query and response report stop instruction fields in the Neasdf_DNS context update request.

In certain embodiment(s), the stop instruction contains shared back off time, the shared back off time being back off time shared by at least two types of reports of the EASDF.

In certain embodiment(s), the stop instruction contains at least one of first back off time and second back off time.

The first back off time is back off time corresponding to a first-type report of the EASDF, and the second back off time is back off time corresponding to a second-type report of the EASDF. The first-type report is a report triggered by a DNS query, referred to as a DNS query report for short. The second-type report is a report triggered by a DNS response, referred to as a DNS response report for short.

The EASDF analytically obtains or reads the back off time from the stop instruction.

Step 760: The EASDF stops, before the back off time is exceeded, transmission of a report to the SMF.

Exemplarily, if the EASDF receives the stop instruction at t1, and the back off time is $t_{bo}$, the EASDF stops transmission of a report to the SMF before $t2=t1+t_{bo}$.

The EASDF simultaneously stops transmission of the first-type report and the second-type report if the stop instruction includes the shared stop instruction. The EASDF stops transmission of the first-type report if the stop instruction includes the first stop instruction. The EASDF stops transmission of the second-type report if the stop instruction includes the second stop instruction.

In certain embodiment(s), the EASDF stops, before the shared back off time is exceeded, transmission of at least two types of reports to the SWF.

In certain embodiment(s), the EASDF stops, before the first back off time is exceeded, transmission of the first-type report to the SMF. In certain embodiment(s), the EASDF stops, before the second back off time is exceeded, transmission of the second-type report to the SMF.

After the EASDF stops transmission of the report, transmission of the report may be resumed in this embodiment in any one of the following two resuming manners.

Resuming Manner 1

Step 782: The SMF transmits a start instruction to the EASDF, the start instruction being used for instructing the EASDF to resume transmission of the report.

The start instruction may be transmitted at any time after step 660.

In certain embodiment(s), the start instruction is contained in the Neasdf_DNS context update response shown in step 7 in FIG. 7. For example, the start instruction is contained in at least one of DNS query and response report start instruction fields in the Neasdf_DNS context update response.

Step 784: The EASDF receives the start instruction.

The start instruction is used for instructing the EASDF to resume transmission of the report.

Step 786: The EASDF resumes, according to the start instruction, transmission of the report to the SMF.

In a design, the start instruction includes a shared start instruction, the shared start instruction being used for instructing the EASDF to resume transmission of the two types of reports, namely simultaneously resuming transmission of the first-type report and the second-type report.

In another design, the start instruction includes at least one of a first start instruction and a second start instruction, the first start instruction being used for instructing the EASDF to resume transmission of the first-type report, and the second start instruction being used for instructing the EASDF to resume transmission of the second-type report.

The EASDF simultaneously resumes transmission of the first-type report and the second-type report if the start instruction includes the shared start instruction. The EASDF resumes transmission of the first-type report if the start instruction includes the first start instruction. The EASDF resumes transmission of the second-type report if the start instruction includes the second start instruction.

Resuming Manner 2

Step 792: The EASDF resumes, after the back off time is exceeded, transmission of the report to the SMF.

The EASDF resumes, after the back off time is exceeded, transmission of the report to the SMF autonomously if the SMF does not transmit any start instruction to the EASDF.

In certain embodiment(s), the EASDF resumes, after the shared back off time is exceeded, transmission of at least two types of reports to the SWF.

In certain embodiment(s), the EASDF resumes, after the first back off time is exceeded, transmission of the first-type report to the SMF. In certain embodiment(s), the EASDF resumes, after the second back off time is exceeded, transmission of the second-type report to the SMF.

In summary, according to the method provided in this embodiment, the EASDF may recover its own reporting mechanism autonomously after the back off time is exceeded, to ensure normal use of UL CL insertion, BP insertion, and other functions.

The steps performed by the SMF in each of the embodiments may be implemented separately as an embodiment of the SMF side. The steps performed by the EASDF in each of the embodiments may be implemented separately as an embodiment of the EASDF side. Each of the embodiments may also be split and recombined based on the understanding of those skilled in the art, and no limits are made thereto in the present disclosure.

It should be understood that although the steps in the flowcharts of FIG. 3, FIG. 4, FIG. 5, FIG. 6, FIG. 7, FIG. 8, FIG. 9 and FIG. 10 are sequentially displayed in accordance with instructions of arrows, these steps are not necessarily performed sequentially in the order indicated by the arrows. Unless otherwise clearly specified in the present disclosure, the steps are performed without any strict sequence limit, and may be performed in other sequences. In addition, at least some steps in FIG. 3, FIG. 4, FIG. 5, FIG. 6, FIG. 7, FIG. 8, FIG. 9 and FIG. 10 may include a plurality of substeps or a plurality of stages. The substeps or the stages are not necessarily performed at a same moment, and instead may be performed at different moments. A performing sequence of the substeps or the stages is not necessarily performing in sequence, and instead may be performing in turn or alternately with another step or at least some of substeps or stages of the another step.

Figure 11:
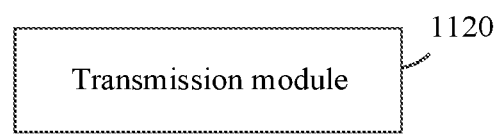
FIG. 11 is a schematic block diagram of a report control apparatus according to certain embodiment(s) of the present disclosure.

FIG. 11 is a block diagram of a report control apparatus according to an exemplary embodiment of the present disclosure. The apparatus may be implemented as an SMF or a part of the SMF or applied to the SMF. The apparatus includes: a transmission module 1120, configured to transmit control information to an EASDF, the control information being used for banning, stopping, or reducing transmission of a report to the SMF by the EASDF.

In an embodiment, the transmission module 1120 is configured to transmit a configuration rule to the EASDF, the configuration rule including a forwarding rule but no reporting rule, and the reporting rule being a rule for triggering the EASDF to transmit the report.

In an embodiment, the transmission module 1120 is configured to configure a limiting threshold for the EASDF such that the EASDF stops transmission of the report when or in response to a determination that a report rate reaches the limiting threshold.

In an embodiment, the transmission module 1120 is configured to transmit a stop instruction to the EASDF when or in response to a determination that a report rate of the EASDF reaches a limiting threshold, the stop instruction being used for instructing the EASDF to stop transmission of the report.

In an embodiment, the stop instruction includes back off time, the back off time being time when the EASDF stops transmission of the report.

In an embodiment, the transmission module 1120 is configured to transmit a start instruction to the EASDF, the start instruction being used for instructing the EASDF to resume transmission of the report.

In an embodiment, the limiting threshold includes a shared threshold, the shared threshold being a threshold shared by at least two types of reports of the EASDF. Alternatively, the limiting threshold includes at least one of a first threshold and a second threshold, the first threshold being a threshold corresponding to a first-type report of the EASDF, and the second threshold being a threshold corresponding to a second-type report of the EASDF.

In an embodiment, the stop instruction includes a shared stop instruction, the shared stop instruction being a stop instruction shared by at least two types of reports of the EASDF. Alternatively, the stop instruction includes at least one of a first stop instruction and a second stop instruction, the first stop instruction being a stop instruction corresponding to a first-type report of the EASDF, and the second stop instruction being a stop instruction corresponding to a second-type report of the EASDF.

In an embodiment, the start instruction includes a shared start instruction, the shared start instruction being a start instruction shared by at least two types of reports of the EASDF. Alternatively, the start instruction includes at least one of a first start instruction and a second start instruction, the first start instruction being a start instruction corresponding to a first-type report of the EASDF, and the second start instruction being a start instruction corresponding to a second-type report of the EASDF.

In an embodiment, the back off time includes shared back off time, the shared back off time being back off time shared by at least two types of reports of the EASDF. Alternatively, the back off time includes at least one of first back off time and second back off time, the first back off time being back off time corresponding to a first-type report of the EASDF, and the second back off time being back off time corresponding to a second-type report of the EASDF.

In an embodiment, the first-type report is a report triggered by a DNS request, and the second-type report is a report triggered by a DNS response.

Figure 12:
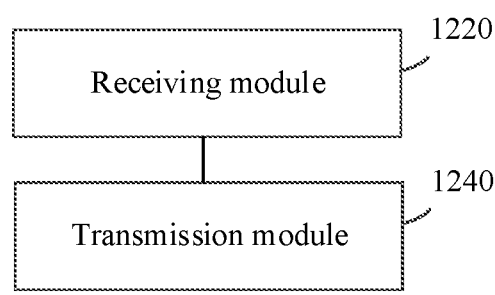
FIG. 12 is a schematic block diagram of a report control apparatus according to certain embodiment(s) of the present disclosure.

FIG. 12 is a block diagram of a report control apparatus according to an exemplary embodiment of the present disclosure. The apparatus may be implemented as an EASDF or a part of the EASDF or applied to the EASDF. The apparatus includes: a receiving module 1220, configured to obtain control information; and a transmission module 1240, configured to ban, stop, reduce, or limit, according to the control information, transmission of a report to a session management function (SMF).

In an embodiment, the receiving module 1220 is configured to receive a configuration rule transmitted by the SMF, the configuration rule including a forwarding rule but no reporting rule, and the reporting rule being a rule for triggering the EASDF to transmit the report.

The transmission module 1240 is configured to ban, according to the configuration rule, transmission of the report to the SMF.

In an embodiment, the receiving module 1220 is configured to receive a limiting threshold configured by the SMF, or, read a local limiting threshold.

The transmission module 1240 is configured to limit a report rate of transmitting the report to the SMF to not exceed the limiting threshold.

In an embodiment, a priority of the limiting threshold configured by the SMF is higher than that of the local limiting threshold.

In an embodiment, the receiving module 1220 is configured to receive a stop instruction transmitted by the SMF, the stop instruction being transmitted by the SMF when or in response to a determination that a report rate of the EASDF reaches a limiting threshold.

The transmission module 1240 is configured to stop, according to the stop instruction, transmission of the report to the SMF.

In an embodiment, the stop instruction includes back off time.

The transmission module 1240 is configured to stop, before the back off time is exceeded, transmission of the report to the SMF.

In an embodiment, the apparatus further includes the following.

The receiving module 1220 is configured to receive a start instruction transmitted by the SMF.

The transmission module 1240 is configured to resume, according to the start instruction, transmission of the report to the SMF.

In an embodiment, the apparatus further includes the following:

The transmission module 1240 is configured to resume, after the back off time is exceeded, transmission of the report to the SMF.

In an embodiment, the limiting threshold includes a shared threshold, the shared threshold being a threshold shared by at least two types of reports of the EASDF. Alternatively, the limiting threshold includes at least one of a first threshold and a second threshold, the first threshold being a threshold corresponding to a first-type report of the EASDF, and the second threshold being a threshold corresponding to a second-type report of the EASDF.

In an embodiment, the stop instruction includes a shared stop instruction, the shared stop instruction being a stop instruction shared by at least two types of reports of the EASDF. Alternatively, the stop instruction includes at least one of a first stop instruction and a second stop instruction, the first stop instruction being a stop instruction corresponding to a first-type report of the EASDF, and the second stop instruction being a stop instruction corresponding to a second-type report of the EASDF.

In an embodiment, the start instruction includes a shared start instruction, the shared start instruction being a start instruction shared by at least two types of reports of the EASDF. Alternatively, the start instruction includes at least one of a first start instruction and a second start instruction, the first start instruction being a start instruction corresponding to a first-type report of the EASDF, and the second start instruction being a start instruction corresponding to a second-type report of the EASDF.

In an embodiment, the back off time includes shared back off time, the shared back off time being back off time shared by at least two types of reports of the EASDF. Alternatively, the back off time includes at least one of first back off time and second back off time, the first back off time being back off time corresponding to a first-type report of the EASDF, and the second back off time being back off time corresponding to a second-type report of the EASDF.

In an embodiment, the first-type report is a report triggered by a DNS request, and the second-type report is a report triggered by a DNS response.

It is to be noted that the transmission module is configured to perform the steps related to transmission in each of the method embodiments, the receiving module is configured to perform the steps related to reception in each of the method embodiments, and a processing module is configured to perform the steps other than the transmission and receiving steps in each of the method embodiments. Elaborations are omitted in this embodiment.

Figure 13:
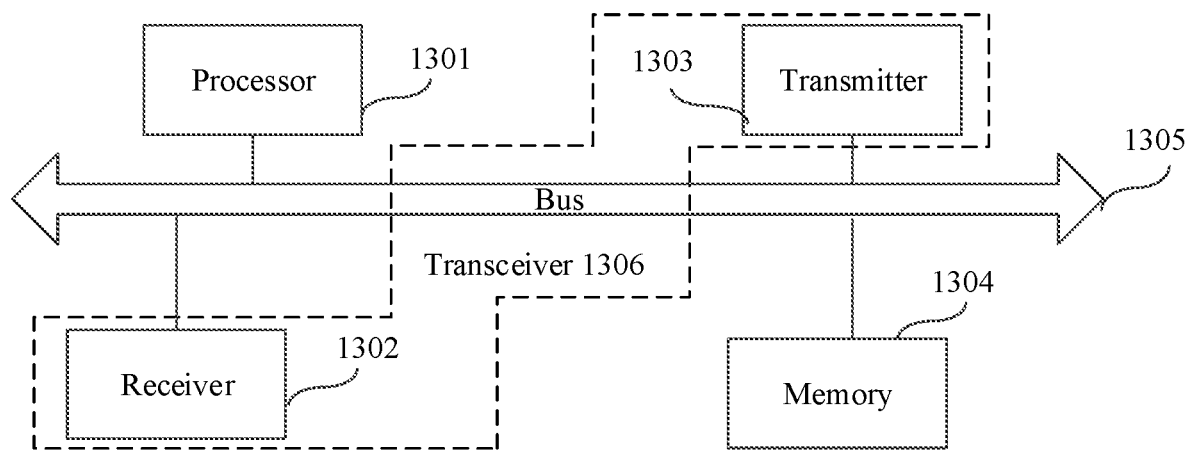
FIG. 13 is a schematic block diagram of a network element device according to certain embodiment(s) of the present disclosure.

FIG. 13 is a schematic structural diagram of a network element device according to an embodiment of the present disclosure. For example, the network element device may be configured to perform the report control method. In certain embodiment(s), the network element device 1300 may include a processor 1301, a receiver 1302, a transmitter 1303, a memory 1304, and a bus 1305.

The processor 1301 includes one or more than one processing core. The processor 1301 runs software programs and modules, to execute various function implementations and information processing.

The receiver 1302 and the transmitter 1303 may be implemented as a transceiver 1306. The transceiver 1306 may be a communication chip.

The memory 1304 is connected to the processor 1301 through the bus 1305.

The memory 1304 may be configured to store a computer program. The processor 1301 is configured to execute the computer program, to implement each step performed by the network element device, access network entity, core network element, or core entity in the method embodiments.

The transmitter 1303 is configured to perform the steps related to transmission in each of the method embodiments. The receiver 1302 is configured to perform the steps related to reception in each of the method embodiments. The processor 1301 is configured to perform the steps other than the transmission and receiving steps in each of the embodiments.

In addition, the memory 1304 may be implemented by a volatile or nonvolatile storage device of any type, or a combination thereof. The volatile or nonvolatile storage device including, but not limited to: a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device.

In an exemplary embodiment, a network element device is further provided, including: a processor and a memory, the memory storing a computer program, and the computer program being loaded and executed by the processor to implement the report control method.

The present disclosure further provides a computer-readable storage medium, the storage medium storing at least one instruction, at least one program, a code set or an instruction set, and the at least one instruction, the at least one program, the code set or the instruction set being loaded and executed by a processor to implement the report control method according to the method embodiments.

In certain embodiment(s), the present disclosure further provides a computer program product, the computer program product including computer instructions, the computer instructions being stored in a computer-readable storage medium. A processor of a computing device reads the computer instructions from the computer-readable storage medium, and executes the computer instructions, so that the computing device performs the report control method according to the aspects.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The sequence numbers of the embodiments of the present disclosure are merely for description purpose.

Those of ordinary skill in the art may understand that all or part of the steps of implementing the embodiments may be implemented by hardware, or may be implemented by a program instructing related hardware. The program may be stored in a computer-readable storage medium. The storage medium mentioned may be a read-only memory, a magnetic disk or an optical disc.

The descriptions are merely embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A report control method, comprising:
   transmitting, by a session management function (SMF), in response to a determination that a report rate of an edge application server discovery function (EASDF) reaches a limiting threshold, a stop instruction to the EASDF, as a defense against a denial of service (DOS) attack or distributed DOS (DDOS) attack, the stop instruction being used for instructing the EASDF to stop transmission of a report to the SMF by the EASDF,
   wherein the report is a report transmitted by the EASDF triggered by a behavior of a user equipment (UE), and the report includes at least one of a domain name system (DNS) query triggered report or a DNS response triggered report.

2. The method according to claim 1, further comprising:
   transmitting, by the SMF, a configuration rule to the EASDF, the configuration rule comprising a forwarding rule but no reporting rule, and the reporting rule being a rule for triggering the EASDF to transmit the report.

3. The method according to claim 1, further comprising:
   configuring, by the SMF, the limiting threshold for the EASDF, the limiting threshold being used for configuring an upper limit of a report rate of the report for the EASDF.

4. The method according to claim 1, wherein the stop instruction includes back off time, the back off time being time when the EASDF stops transmission of the report.

5. The method according to claim 1, further comprising:
   transmitting, by the SMF, a start instruction to the EASDF, the start instruction being used for instructing the EASDF to resume transmission of the report.

6. The method according to claim 5, wherein
   the start instruction includes a shared start instruction, the shared start instruction being a start instruction shared by at least two types of reports of the EASDF; or,
   the start instruction includes at least one of a first start instruction and a second start instruction, the first start instruction being a start instruction corresponding to a first-type report of the EASDF, and the second start instruction being a start instruction corresponding to a second-type report of the EASDF.

7. The method according to claim 5, wherein
   the back off time includes shared back off time, the shared back off time being back off time shared by at least two types of reports of the EASDF; or,
   the back off time includes one or both of first back off time and second back off time, the first back off time being back off time corresponding to a first-type report of the EASDF, and the second back off time being back off time corresponding to a second-type report of the EASDF.

8. The method according to claim 1, wherein
   the limiting threshold includes a shared threshold, the shared threshold being a threshold shared by at least two types of reports of the EASDF; or,
   the limiting threshold includes one or both of a first threshold and a second threshold, the first threshold being a threshold corresponding to a first-type report of the EASDF, and the second threshold being a threshold corresponding to a second-type report of the EASDF.

9. The method according to claim 1, wherein
   the stop instruction includes a shared stop instruction, the shared stop instruction being a stop instruction shared by at least two types of reports of the EASDF; or,
   the stop instruction includes at least one of a first stop instruction and a second stop instruction, the first stop instruction being a stop instruction corresponding to a first-type report of the EASDF, and the second stop instruction being a stop instruction corresponding to a second-type report of the EASDF.

10. A report control apparatus, comprising: a memory storing computer program instructions; and a processor coupled to the memory and configured to execute the computer program instructions and perform:
    transmitting, by a session management function (SMF), in response to a determination that a report rate of an edge application server discovery function (EASDF) reaches a limiting threshold, a stop instruction to the EASDF, as a defense against a denial of service (DOS) attack or distributed DOS (DDOS) attack, the stop instruction being used for instructing the EASDF to stop transmission of a report to the SMF by the EASDF, wherein the report is a report transmitted by the EASDF triggered by a behavior of a user equipment (UE), and the report includes at least one of a domain name system (DNS) query triggered report or a DNS response triggered report.

11. The apparatus according to claim 10, wherein the processor is further configured to perform:

transmitting, by the SMF, a configuration rule to the EASDF, the configuration rule comprising a forwarding rule but no reporting rule, and the reporting rule being a rule for triggering the EASDF to transmit the report.

12. The apparatus according to claim 10, wherein the processor is further configured to perform:

configuring, by the SMF, the limiting threshold for the EASDF, the limiting threshold being used for configuring an upper limit of a report rate of the report for the EASDF.

13. The apparatus according to claim 10, wherein the stop instruction includes back off time, the back off time being time when the EASDF stops transmission of the report.

14. The apparatus according to claim 10, wherein the processor is further configured to execute the computer program instructions and perform:

transmitting, by the SMF, a start instruction to the EASDF, the start instruction being used for instructing the EASDF to resume transmission of the report.

15. The apparatus according to claim 14, wherein the start instruction includes a shared start instruction, the shared start instruction being a start instruction shared by at least two types of reports of the EASDF; or, the start instruction includes at least one of a first start instruction and a second start instruction, the first start instruction being a start instruction corresponding to a first-type report of the EASDF, and the second start instruction being a start instruction corresponding to a second-type report of the EASDF.

16. The apparatus according to claim 10, wherein the limiting threshold includes a shared threshold, the shared threshold being a threshold shared by at least two types of reports of the EASDF; or, the limiting threshold includes one or both of a first threshold and a second threshold, the first threshold being a threshold corresponding to a first-type report of the EASDF, and the second threshold being a threshold corresponding to a second-type report of the EASDF.

17. The apparatus according to claim 10, wherein the stop instruction includes a shared stop instruction, the shared stop instruction being a stop instruction shared by at least two types of reports of the EASDF; or, the stop instruction includes at least one of a first stop instruction and a second stop instruction, the first stop instruction being a stop instruction corresponding to a first-type report of the EASDF, and the second stop instruction being a stop instruction corresponding to a second-type report of the EASDF.

18. A non-transitory computer-readable storage medium storing computer program instructions executable by at least one processor to perform:

transmitting, by a session management function (SMF), in response to a determination that a report rate of an edge application server discovery function (EASDF) reaches a limiting threshold, a stop instruction to the EASDF, as a defense against a denial of service (DOS) attack or distributed DOS (DDOS) attack, the stop instruction being used for instructing the EASDF to stop transmission of a report to the SMF by the EASDF, wherein the report is a report transmitted by the EASDF triggered by a behavior of a user equipment (UE), and the report includes at least one of a domain name system (DNS) query triggered report or a DNS response triggered report.

* * * * *